3,477,830
PRODUCTION OF SINTERABLE URANIUM DIOXIDE
Karl-Gerhard Hackstein, Hanau am Main, Hans Pirk, Dornigheim (Main), and Dieter Karl Maulbecker, Hanau am Main, Germany, assignors to Nukem Nuklear-Chemie und -Metallurgie Gesellschaft m.b.H., Wolfgang, near Hanau am Main, Germany
No Drawing. Filed Mar. 20, 1967, Ser. No. 624,187
Claims priority, application Germany, Apr. 2, 1966, N 28,327
Int. Cl. C01g 43/02, 1/02
U.S. Cl. 23—355        7 Claims

ABSTRACT OF THE DISCLOSURE

Production of sinterable uranium dioxide by reacting $UF_6$ and $NH_3$ gas and subjecting the reaction product to pyrohydrolysis with steam at temperatures, for example, between 450 and 600° C.

BACKGROUND OF THE INVENTION

The present invention relates to the conversion of $UF_6$ to a uranium oxide product of high purity and good sintering properties.

Dense uranium dioxide ($UO_2$) with various contents of fissionable isotope-235 finds many uses as a nuclear fuel. Uranium hexafluoride ($UF_6$) which is a product obtained in isotope separations is mostly used as the starting material. Such compound must be chemically processed to convert it to $UO_2$ powder from which shaped bodies of high density are produced by sintering. The requirements with regard to purity and sintering properties which are placed on the $UO_2$ powder are considerable.

Various procedures have been used in order to produce a stable product. For example, $UF_6$ is converted with water to a solution of $UO_2F_2+4HF$. The uranium content of such solution is then either precipitated with ammonia as ammonium di-uranate (ADU) or with ammonium carbonate as ammonium uranyl carbonate (AUC). The precipitated ADU or AUC, which unavoidably is contaminated with 2 to 4% of F is washed and dried and, if desired, calcined in air to $U_3O_8$ and then treated for a longer period of time at elevated temperatures with a hydrogen-steam mixture. The steam is necessary to reduce the fluoride content to below 100 p.p.m. and this practically can only be achieved by a pyrohydrolysis lasting at least several hours.

This process is a multistep process and very laborious. Working with aqueous HF solutions provides considerable corrosion problems. Taking into consideration the criticality problems and the dependability of the operation, such process is very difficult to control and can only be carried out continuously with high apparatus expenditures.

In addition the powder obtained after the pyrohydrolysis under reducing conditions does not have good sintering properties and such powder therefore must be activated by costly processes before it is suited for the production of sintered bodies of high density. As the value of uranium is considerable, the unavoidable uranium losses with the filtrate and wash water are of considerable importance.

In other processes $UF_6$ is converted with steam to $UO_2F_2$ (solid) and 4HF (gas) preferably in a fluidized bed. The $UO_2F_2$ subsequently is pyrohydrolysed and reduced with $H_2$ under an atmosphere of steam. This process requires high temperatures around 700° C., as only then does the conversion of the $UO_2F_2$ proceed with satisfactory rapidity. The real disadvantage of such process is that the $UO_2$ obtained at these high temperatures is inactive and must be rendered active and capable of sintering by cumbersome fine grinding procedures which involve dust problems.

SUMMARY OF THE INVENTION

According to the invention it was found that the above-mentioned problems of the prior art procedures for the production of a sinterable $UO_2$ product could be overcome and that a product of high purity and good sintering properties could be obtained in a simple and economical way of reacting $UF_6$ with ammonia gas and the reaction product then converted to $UO_2$ at elevated temperatures, for example, about 500° C. with steam.

DETAILED DESCRIPTION OF THE INVENTION INCLUDING PREFERRED EMBODIMENTS

While it is known that $UF_6$ reacts with ammonia already at room temperature, it was found that the reaction in the temperature range up to about 400° C. according to the following equation

$$3UF_6 + 8NH_3 = 3NH_4UF_5 + 3NH_4F + N_2$$

produces an ammonium uranium fluoride in the form of a green loose powder which is easy to handle and surprisingly can be converted with steam at temperatures from 450° C. to very active $UO_2$ powder with excellent sintering properties when the pyrohydrolysis is carried out under suited conditions.

The reaction of $UF_6$ with $NH_3$ is exothermic and proceeds momentarily even at low temperatures. The temperatures employed for this reaction can be between 0 and 600° C. and preferably are between about 300 and 550° C. It was found that the composition of the reaction product could be controlled within the range of $NH_4UF_5 \cdot NH_4F$ over $NH_4UF_5$ to $UF_4$ in a simple manner by selection of the reaction temperature employed. At temperatures of above 500° C. practically pure $UF_4$ is produced.

The reaction between the $UF_6$ and $NH_3$ can, for example, be carried out in an upright cylindrical shaft type reactor into which the reactants are supplied downwardly through a concentric double nozzle, the $UF_6$, for example, being supplied in gaseous form through the central nozzle and the ammonia through the surrounding annular nozzle so that the reaction is carried out as a type of flame reaction. The resulting product can be removed continuously from the bottom of the reactor with the aid of a screw conveyor or similar device and, if desired, also be granulated by vibration in a receiving vessel. Instead of using a shaft type reactor, a cyclone type reactor may also, for example be used into which the reactants are supplied through separate spaced nozzles.

The product thus obtained, it was unexpectedly found, could be converted with steam at a sufficiently high reaction velocity to $UO_2$ already at relatively low temperatures, for example, between about 450 and 650° C. and preferably between about 500 and 600° C. This is of particular significance as the sintering properties of the $UO_2$ powder obtained at such low pyrohydrolysis temperatures are good and in addition the reduction of the fluoride content to required value of less than 100 p.p.m. is also effected in a relatively short pyrohydrolysis time. It was also found that such products which still contain free and/or bound $NH_4F$ yield a particularly active $UO_2$ after the pyrohydrolysis, particularly, when such product already comes into contact with steam at temperatures from 250° C., that is, it is contacted with steam as its temperature is raised from 250° C. to the temperature employed for the pyrohydrolysis.

The pyrohydrolysis can also, for example, be carried out in an upright shaft type furnace by introdutcion of the product of the $UF_6+NH_3$ reaction into the top thereof and supplying steam to the lower portion thereof through a fritted bottom. Preferably two heating zones are provided in such furnace, namely, a preheating zone in the upper portion thereof in which the product is preheated to about 250° C. and a zone in the lower portion which is heated to the temperature employed for the pyrohydrolysis.

A special advantage of the process according to the invention is that it is easily carried out in a continuous manner in both steps, that is, the reaction with $NH_3$ and the pyrohydrolysis.

The process according to the invention therefore provides the following advantages:

(1) The process is a dry process which is easy to regulate and control.

(2) The reaction between $UF_6$ and $NH_3$ proceeds quantitatively even at low temperatures and can be controlled in a further temperature range.

(3) Ammonia is a cheap and easily available reducing agent.

(4) The pyrolysis proceeds quantitatively already at temperatures around 450° C. and yields a product of good sintering properties and a high surface area.

(5) Corrosion problems which are difficult to solve do not occur.

(6) It is easily carried out as a continuous process.

The following examples will serve to illustrate the invention.

Example 1

30 kg. $UF_6$ gas and 10 m.³ $NH_3$ per hour were supplied into the upper end of an upright cylindrical $V_2A$ steel reaction vessel 30 cm. in diameter and 200 cm. high. The $UF_6$ gas was supplied through a central nozzle and the $NH_3$ through an annular nozzle concentric therewith. The exhaust gases were exhausted through filter candles arranged in the upper portion of the reaction vessel. Such filter candles were arranged so that they could be cleaned by blowing gas back through them. The reaction vessel was maintained at about 90° C. with water cooling. The ammonium uranium fluoride (AUF) was taken out of the bottom of the reaction vessel and supplied to a vibrating receiving vessel in which it was compressed to round granules 1-2 mm. in diameter which were then removed with the aid of a screw conveyor. The product was of the composition $NH_4UF_5 \cdot NH_4F$.

Example 2

The procedure of Example 1 was repeated except that the cylindrical reaction vessel was heated so that its wall temperature was about 300° C.

The product obtained almost exactly corresponded to the formula $NH_4UF_5$.

Example 3

The procedure of Example 1 was again repeated except that the reaction vessel and the flame temperature were maintained at 550° C.

The product practically was $UF_4$.

Example 4

The products obtained in Examples 1-3 were pyrohydrolysed with steam in an upright shaft type furnace having a built in fritted bottom for 2 to 3 hours at temperatures about 550° C. Steam was already supplied to such products as the temperature thereof was raised from 250° C. to the actual temperature used for the pyrohydrolysis. The $UO_2$ produced had BET surface areas of 5.1 to 3.5 m.²/g. with apparent bulk densities around 0.8–1 g./cm.³. The products of Examples 1 and 2 had the higher surface area.

Example 5

The pyrohydrolysed products obtained according to Example 4 were compressed, without the aid of a binder, to cylinders 10 mm. in diameter and 14 mm. high at a pressure of only 1.4 tons/cm.². The green compacts which had a density of about 5 g./cm.³ were then sintered for 2 hours at 1650° C. The sintered densities were between 10.5 and 10.7 g./cm.³.

What we claim is:

1. Process for the production of uranium dioxide in a form having good sintering properties which comprises reacting gaseous $UF_6$ with gaseous $NH_3$ at a temperature between 0 and 600° C. to produce a reaction product in which the uranium is in a lower valent form greater than 3 and subsequently subjecting such reaction product to pyrohydrolysis with steam to product uranium dioxide.

2. The process of claim 1 in which said reaction between $UF_6$ and $NH_3$ is carried out at a temperature between 300 and 550° C.

3. The process of claim 1 in which said pyrohydrolysis is carried out at a temperature between 450 and 650° C.

4. The process of claim 1 in which said pyrohydrolysis is carried out at a temperature between 500 and 600° C.

5. The process of claim 4 in which the said reaction product is contacted with steam already at temperatures from 250° C.

6. The process of claim 4 in which the uranium in said reaction product obtained by reaction of $UF_6$ and $NH_3$ is in quadrivalent form.

7. The process of claim 6 in which said reaction product contains ammonium fluoride.

References Cited

UNITED STATES PATENTS

| | | | |
|---|---|---|---|
| 2,953,430 | 9/1960 | Leaders et al. | 23—355 |
| 3,179,491 | 4/1965 | Ukaji et al. | 23—355 |

OTHER REFERENCES

Galkin, N. P., Sudarikov, B. M., Zaitsev, V. A., Reaction of $UF_6$ With Ammonia, Nuclear Science Abstracts, vol. 14, abs. #14–18906, Oct. 15, 1960.

CARL D. QUARFORTH, Primary Examiner

M. J. McGREAL, Assistant Examiner